US012248346B1

(12) United States Patent
Zandian et al.

(10) Patent No.: US 12,248,346 B1
(45) Date of Patent: *Mar. 11, 2025

(54) THERMAL MANAGEMENT FOR EXTENDED REALITY ECOSYSTEM

(71) Applicant: Meta Platforms Technologies, LLC, Menlo Park, CA (US)

(72) Inventors: Bardia Zandian, Redwood City, CA (US); Eugene Gorbatov, Sammamish, WA (US); Pankaj Raghuvanshi, San Jose, CA (US); Shrirang Madhav Yardi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,102

(22) Filed: Nov. 30, 2023

Related U.S. Application Data

(63) Continuation of application No. 17/499,757, filed on Oct. 12, 2021, now Pat. No. 11,886,259.

(51) Int. Cl.
*G06F 1/20* (2006.01)
*G06F 1/16* (2006.01)
*G06T 15/00* (2011.01)

(52) U.S. Cl.
CPC .............. *G06F 1/206* (2013.01); *G06F 1/163* (2013.01); *G06T 15/005* (2013.01)

(58) Field of Classification Search
CPC ...... G06F 9/5094; G06F 1/329; G06F 9/4893; G06F 9/5027; G06F 1/324; G06F 1/3296; Y02D 10/00
See application file for complete search history.

(56) References Cited

U.S. PATENT DOCUMENTS 9,311,152 B2   4/2016 Miller et al.
9,348,656 B2   5/2016 Presant et al.
(Continued)

OTHER PUBLICATIONS

International Preliminary Report on Patentability for International Application No. PCT/US2022/046200, mailed Apr. 25, 2024, 7 pages.
(Continued)

*Primary Examiner* — Zhipeng Wang
(74) *Attorney, Agent, or Firm* — McDermott Will & Emery LLP

(57) ABSTRACT

A method by a computing system associated with a set of disjoint devices that includes at least one wearable device includes receiving a request to perform a task. The method further includes determining, based on sensor data associated with the set of disjoint devices, a thermal-constraint differential for each device of the set of disjoint devices. The method further includes determining a plurality of workload assignments needed to be performed to accomplish the task. The method further includes distributing, based on the thermal-constraint differentials of the set of disjoint devices, the plurality of workload assignments to one or more devices of the set of disjoint devices to satisfy one or more power or thermal constraints associated with each device of the set of disjoint devices. The method further includes performing the task by causing the one or more devices to execute the distributed plurality of work assignments.

20 Claims, 9 Drawing Sheets

(56) References Cited

U.S. PATENT DOCUMENTS

| | | | |
|---|---|---|---|
| 10,064,141 B2 | 8/2018 | Lee et al. | |
| 2013/0109371 A1* | 5/2013 | Brogan | G06F 1/1639 |
| | | | 361/679.09 |
| 2017/0083364 A1* | 3/2017 | Zhao | G06F 9/5083 |
| 2017/0139462 A1* | 5/2017 | Potlapally | G06F 11/3062 |
| 2017/0329649 A1* | 11/2017 | Cudak | G06F 1/206 |
| 2018/0004260 A1* | 1/2018 | Amin-Shahidi | G06F 1/206 |
| 2018/0329465 A1 | 11/2018 | Tavakoli et al. | |
| 2018/0332160 A1* | 11/2018 | Brogan | G06F 1/1639 |
| 2019/0034235 A1 | 1/2019 | Yang et al. | |
| 2019/0114212 A1* | 4/2019 | Gwin | G06F 1/3206 |
| 2019/0122463 A1* | 4/2019 | Romero | G07C 9/22 |
| 2019/0324517 A1 | 10/2019 | Keceli et al. | |
| 2020/0285298 A1* | 9/2020 | Basu | G06F 1/3275 |
| 2020/0409755 A1 | 12/2020 | Macnamara et al. | |
| 2022/0147016 A1* | 5/2022 | Vishwakarma | G05B 19/406 |
| 2022/0240408 A1* | 7/2022 | Faulkner | H05K 7/1492 |
| 2022/0308927 A1* | 9/2022 | Chen | G06F 9/5038 |

OTHER PUBLICATIONS

International Search report and Written Opinion for International Application No. PCT/US2022/046200, mailed Dec. 19, 2022, 8 pages.

\* cited by examiner

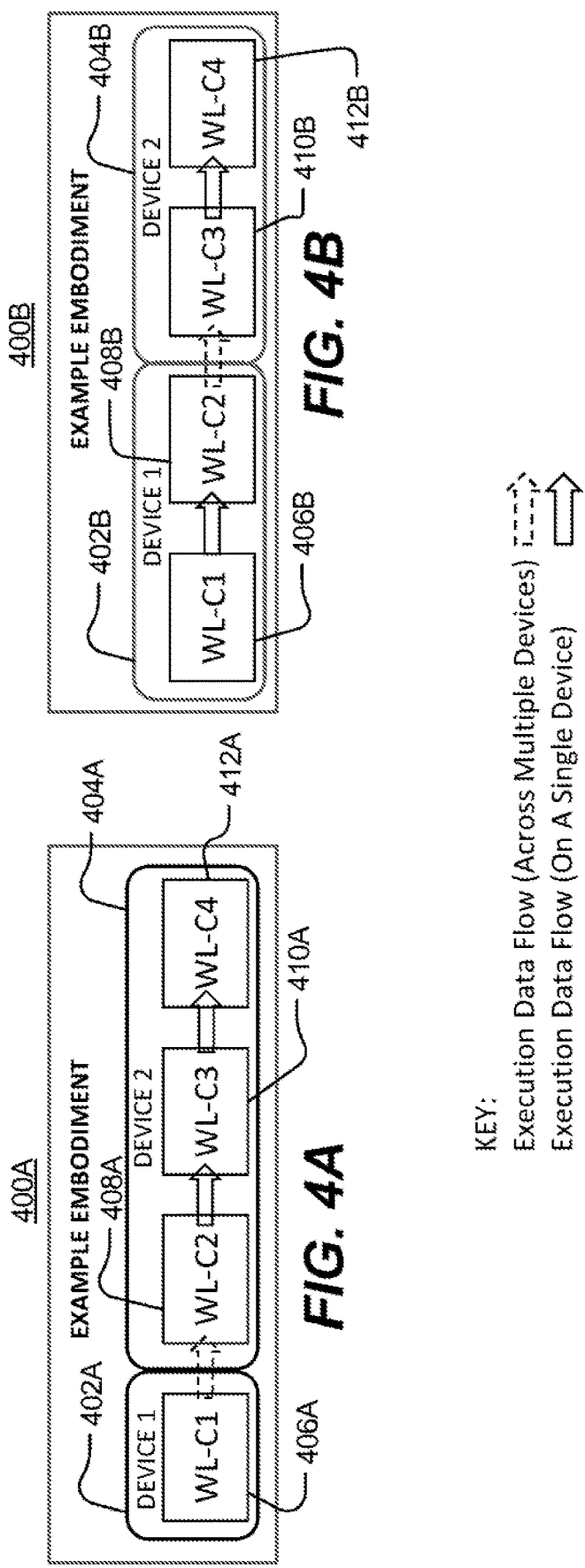

THERMAL MANAGEMENT FOR EXTENDED REALITY ECOSYSTEM

PRIORITY

This application is a continuation under 35 U.S.C. § 120 of U.S. patent application Ser. No. 17/499,757, filed 12 Oct. 2021, which is incorporated herein by reference.

TECHNICAL FIELD

This disclosure relates generally to extended reality (XR) environments, and, more particularly, to thermal management for device ecosystems in XR environments.

BACKGROUND

An extended reality (XR) system may generally include a real-world environment that includes XR content overlaying one or more features of the real-world environment. In typical XR systems, image data may be rendered on, for example, a robust head-mounted display (HMD) that may be coupled through a physical wired or wireless connection to a base graphics generation device responsible for generating the image data. However, in some instances, in which the HMD includes, for example, lightweight XR glasses and/or other wearable electronic devices as opposed to more robust headset devices, the XR glasses or other lightweight wearable electronic devices may, in comparison, include reduced processing power, low-resolution cameras, and/or relatively simple tracking optics. Additionally, due to the smaller architectural area, the XR glasses or other lightweight wearable electronic devices may also include reduced power management (e.g., batteries, battery size) and thermal management (e.g., cooling fans, heat sinks) electronics. This may often preclude such devices from maximizing performance while reducing power consumption and thermal impact. It may be thus useful to provide techniques to improve XR systems.

SUMMARY OF PARTICULAR EMBODIMENTS

The present embodiments are directed toward providing an N-device thermal management and workload distribution framework to dynamically select an N number of devices of an ecosystem of disjoint devices and schedule and distribute the processing workload across each of the devices or a subset of the devices based on runtime thermal conditions. In particular embodiments, the N-device thermal management and workload distribution framework may receive a request to perform a task. In particular embodiments, the N-device thermal management and workload distribution framework of the device may then determine, based on sensor data associated with the set of disjoint devices, a thermal-constraint differential for each device of the set of disjoint devices. For example, in particular embodiments, the N-device thermal management and workload distribution framework may determine, for each device of the set of disjoint devices, the thermal constraint differential by determining, based on sensor data associated with the set of disjoint devices, the thermal-constraint differential for each device of the set of disjoint devices by determining a difference between a predetermined thermal design power (TDP) limit and a current power consumption. In particular embodiments, the N-device thermal management and workload distribution framework may, for example, determine, based on sensor data associated with the set of disjoint devices, the thermal-constraint differential for each device of the set of disjoint devices by determining the thermal constraint differential at runtime.

In particular embodiments, the N-device thermal management and workload distribution framework may then determine a plurality of workload assignments needed to be performed to accomplish the task. For example, in particular embodiments, prior to determining the plurality of workload assignments needed to be performed to accomplish the task, the N-device thermal management and workload distribution framework may then determine one or more execution parameters associated with an application corresponding to the task to be performed; and estimate, based on the one or more execution parameters associated with the application, a power consumption of the plurality of workload assignments. In particular embodiments, the N-device thermal management and workload distribution framework may then determine the one or more rendering workload assignments to be performed by the set of disjoint devices based on the thermal constraint differential and the estimation of the power consumption of the rendering workload associated with rendering the frame.

In particular embodiments, the N-device thermal management and workload distribution framework may then distribute, based on the thermal-constraint differentials of the set of disjoint devices, the plurality of workload assignments to one or more devices of the set of disjoint devices to satisfy one or more power or thermal constraints associated with each device of the set of disjoint devices. For example, in particular embodiments, the N-device thermal management and workload distribution framework may determine the plurality of workload assignments based on the thermal constraint differential and the estimation of the power consumption of the plurality of workload assignments. In particular embodiments, a number of the plurality of workload assignments is greater than a number of the one or more devices of the set of disjoint devices, and the one or more power or thermal constraints comprises a device processing speed, a device storage capacity, a device thermal rating, or a device power rating.

In particular embodiments, the N-device thermal management and workload distribution framework may then perform the task by causing the one or more devices to execute the distributed plurality of work assignments. For example, in particular embodiments, the one or more devices of the set of disjoint devices may include a first subset of the set of disjoint devices. In particular embodiments, the determining, based on sensor data associated with the set of disjoint devices, a second thermal-constraint differential for each device of the set of disjoint devices; and redistributing, based on the second thermal-constraint differentials of the set of disjoint devices, the plurality of workload assignments to a second subset of the set of disjoint devices. For example, in particular embodiments, one or more devices of the second subset of the set of disjoint devices may be different from one or more devices of the first subset of the set of disjoint devices.

Thus, in accordance with the foregoing embodiments, the present techniques are directed toward providing an N-device thermal management and workload distribution framework to dynamically select an N number of devices and schedule and distribute the processing workload across each of the devices or a subset of the devices based on runtime thermal conditions. For example, the N-device thermal management and workload distribution framework may utilize sensor data or other telemetry data to determine processing performance, power consumption, operating temperature, ambient temperature, and so forth with respect to each of the ecosystem of devices. The N-device thermal management and workload distribution framework may then calculate the available thermal design power (TDP) limit headroom for each of the ecosystem of devices. The TDP may be utilized for determining which devices of the ecosystem of devices to utilize and the manner in which the current processing workload should be distributed across these devices, such that performance is maximized while reducing power consumption and thermal impact. For example, the N-device thermal management and workload distribution framework may, at runtime, schedule and distribute the processing workload to be performed on the respective devices of the ecosystem of devices, and then dynamically configure and switch the respective operations being performed by the respective devices based on the current thermal conditions, such that even under changing device operating conditions (e.g. user moving from an indoor space to an outdoor space, changes in ambient temperature, and so forth), the user XR experience may proceed seamlessly and more desirably.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 4A-4H illustrates an example extended reality (XR) system

DESCRIPTION OF EXAMPLE EMBODIMENTS

Figure 1:
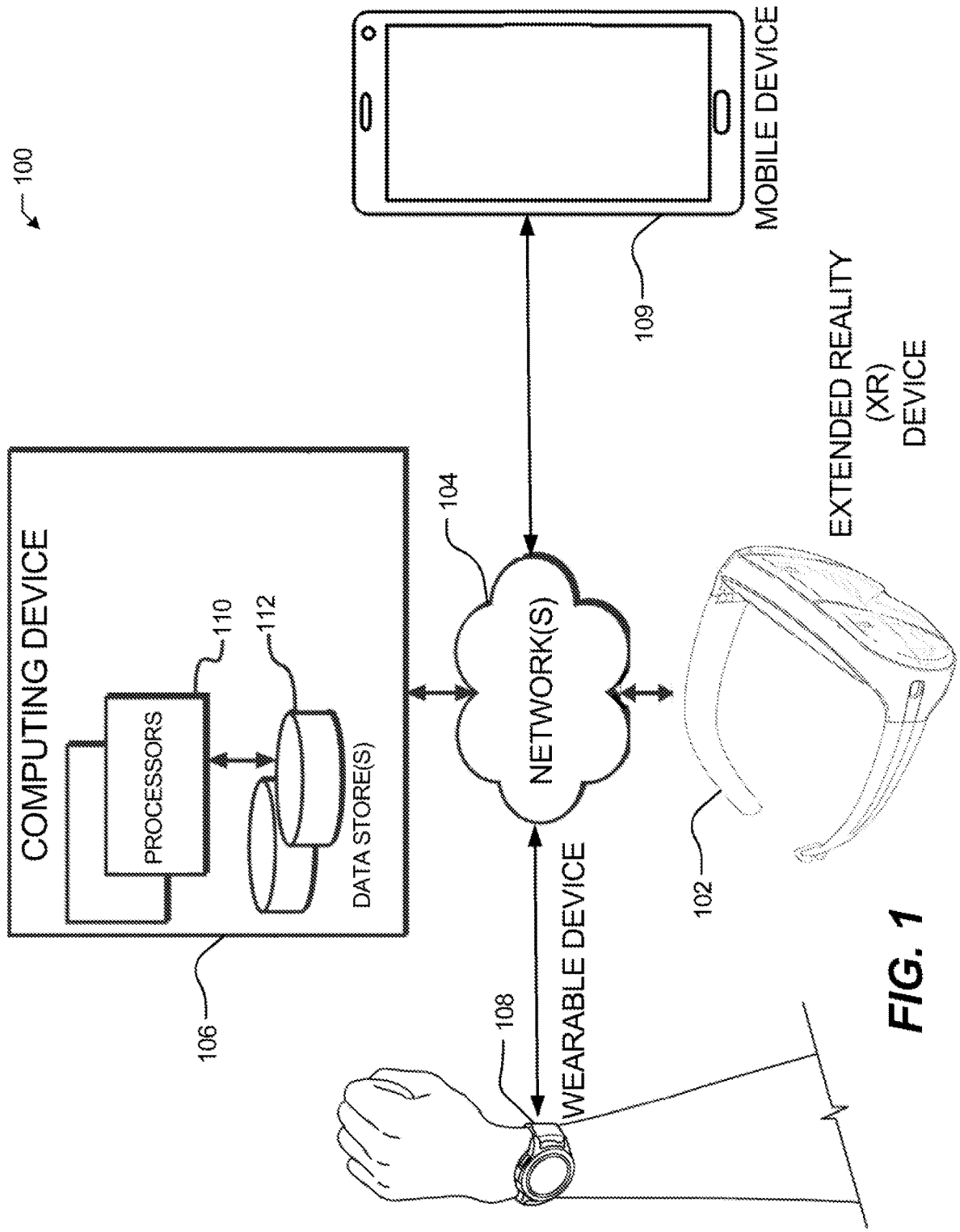
FIG. 1 illustrates an example extended reality (XR) system.

An extended reality (XR) system may generally include a real-world environment that includes XR content overlaying one or more features of the real-world environment. In typical XR systems, image data may be rendered on, for example, a robust head-mounted display (HMD) that may be coupled through a physical wired or wireless connection to a base graphics generation device responsible for generating the image data. However, in some instances, in which the HMD includes, for example, lightweight XR glasses and/or other wearable electronic devices as opposed to more robust headset devices, the XR glasses or other lightweight wearable electronic devices may, in comparison, include reduced processing power, low-resolution cameras, and/or relatively simple tracking optics. Additionally, due to the smaller architectural area, the XR glasses or other lightweight wearable electronic devices may also include reduced power management (e.g., batteries, battery size) and thermal management (e.g., cooling fans, heat sinks) electronics. This may often preclude such devices from maximizing performance while reducing power consumption and thermal impact. It may be thus useful to provide techniques to improve XR systems.

Accordingly, the present embodiments are directed toward providing an N-device thermal management and workload distribution framework to dynamically select an N number of devices of an ecosystem of disjoint devices and schedule and distribute the processing workload across each of the devices or a subset of the devices based on runtime thermal conditions. In particular embodiments, the N-device thermal management and workload distribution framework may receive a request to perform a task. In particular embodiments, the N-device thermal management and workload distribution framework of the device may then determine, based on sensor data associated with the set of disjoint devices, a thermal-constraint differential for each device of the set of disjoint devices. For example, in particular embodiments, the N-device thermal management and workload distribution framework may determine, for each device of the set of disjoint devices, the thermal constraint differential by determining, based on sensor data associated with the set of disjoint devices, the thermal-constraint differential for each device of the set of disjoint devices by determining a difference between a predetermined thermal design power (TDP) limit and a current power consumption. In particular embodiments, the N-device thermal management and workload distribution framework may, for example, determine, based on sensor data associated with the set of disjoint devices, the thermal-constraint differential for each device of the set of disjoint devices by determining the thermal constraint differential at runtime.

In particular embodiments, the N-device thermal management and workload distribution framework may then determine a plurality of workload assignments needed to be performed to accomplish the task. For example, in particular embodiments, prior to determining the plurality of workload assignments needed to be performed to accomplish the task, the N-device thermal management and workload distribution framework may then determine one or more execution parameters associated with an application corresponding to the task to be performed; and estimate, based on the one or more execution parameters associated with the application, a power consumption of the plurality of workload assignments. In particular embodiments, the N-device thermal management and workload distribution framework may then determine the one or more rendering workload assignments to be performed by the set of disjoint devices based on the thermal constraint differential and the estimation of the power consumption of the rendering workload associated with rendering the frame.

In particular embodiments, the N-device thermal management and workload distribution framework may then distribute, based on the thermal-constraint differentials of the set of disjoint devices, the plurality of workload assignments to one or more devices of the set of disjoint devices to satisfy one or more power or thermal constraints associated with each device of the set of disjoint devices. For example, in particular embodiments, the N-device thermal management and workload distribution framework may determine the plurality of workload assignments based on the thermal constraint differential and the estimation of the power consumption of the plurality of workload assignments. In particular embodiments, a number of the plurality of workload assignments is greater than a number of the one or more devices of the set of disjoint devices, and the one or more power or thermal constraints comprises a device processing speed, a device storage capacity, a device thermal rating, or a device power rating.

In particular embodiments, the N-device thermal management and workload distribution framework may then perform the task by causing the one or more devices to execute the distributed plurality of work assignments. For example, in particular embodiments, the one or more devices of the set of disjoint devices may include a first subset of the set of disjoint devices. In particular embodiments, the determining, based on sensor data associated with the set of disjoint devices, a second thermal-constraint differential for each device of the set of disjoint devices; and redistributing, based on the second thermal-constraint differentials of the set of disjoint devices, the plurality of workload assignments to a second subset of the set of disjoint devices. For example, in particular embodiments, one or more devices of the second subset of the set of disjoint devices may be different from one or more devices of the first subset of the set of disjoint devices.

Thus, in accordance with the foregoing embodiments, the present techniques are directed toward providing an N-device thermal management and workload distribution framework to dynamically select an N number of devices and schedule and distribute the processing workload across each of the devices or a subset of the devices based on runtime thermal conditions. For example, the N-device thermal management and workload distribution framework may utilize sensor data or other telemetry data to determine processing performance, power consumption, operating temperature, ambient temperature, and so forth with respect to each of the ecosystem of devices. The N-device thermal management and workload distribution framework may then calculate the available thermal design power (TDP) limit headroom for each of the ecosystem of devices. The TDP may be utilized for determining which devices of the ecosystem of devices to utilize and the manner in which the current processing workload should be distributed across these devices, such that performance is maximized while reducing power consumption and thermal impact. For example, the N-device thermal management and workload distribution framework may, at runtime, schedule and distribute the processing workload to be performed on the respective devices of the ecosystem of devices, and then dynamically configure and switch the respective operations being performed by the respective devices based on the current thermal conditions, such that even under changing device operating conditions (e.g. user moving from an indoor space to an outdoor space, changes in ambient temperature, and so forth), the user XR experience may proceed seamlessly and more desirably.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In particular embodiments, the "extended reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "extended reality" may be associated with applications, products, accessories, services, or a combination thereof, that, for example, may be utilized to create content in extended reality and/or utilized in (e.g., perform activities) an extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers. In particular embodiments, in which the HMD includes, for example, lightweight XR glasses or spectacles as opposed to more robust headset devices, the XR glasses or spectacles may, in comparison, include reduced processing power, low-resolution/low-cost cameras, and/or relatively simple tracking optics. Additionally, due to the smaller architectural area, the XR glasses or spectacles may also include reduced power management (e.g., batteries, battery size) and thermal management (e.g., cooling fans, heat sinks) electronics.

FIG. 1 illustrates an example extended reality (XR) ecosystem 100 that may be suitable for providing an N-device thermal management and workload distribution framework to dynamically select an N number of devices and schedule and distribute the processing workload across each of the devices or a subset of the devices based on runtime thermal conditions, in accordance with the presently disclosed embodiments. In particular embodiments, the XR ecosystem 100 may include an XR device 102, a network 104, a computing device 106, a wearable device 108, and a mobile device 109, all of which may be associated with, for example, a single user and may be coupled to each other via the network 104. In particular embodiments, a user may wear the XR device 102 that may display visual extended reality content to the user. The XR device 102 may include an audio device that may provide audio extended reality content to the user. In particular embodiments, the XR device 102 may include one or more cameras which can capture images and videos of environments. The XR device 102 may include an eye tracking system to determine the vergence distance of the user. In particular embodiments, the XR device 102 may include a lightweight head-mounted display (HMD) (e.g., goggles, eyeglasses, spectacles, a visor, and so forth). In particular embodiments, the XR device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the XR device 102 to the computing device 106.

In particular embodiments, the computing device 106 may include, for example, a standalone host computing system, an on-board computer system integrated with the XR device 102, a mobile device, or any other hardware platform that may be capable of providing extended reality content to the XR device 102. In particular embodiments, the computing device 106 may include, for example, a cloud-based computing architecture (including one or more processors 110 and data stores 112) suitable for hosting and servicing XR applications or experiences executing on the XR device 102. For example, in particular embodiments, the computing device 106 may include a Platform as a Service (PaaS) architecture, a Software as a Service (SaaS) architecture, and an Infrastructure as a Service (IaaS) architecture, a Data as a Service (DaaS) architecture, a Compute as a Service (CaaS) architecture, or other similar cloud-based computing architecture.

In particular embodiments, the wearable device 108 may include, for example, any wearable electronic device (e.g., a watch, an exercise tracker, a medical wristband device, an armband device, and so forth) that the user may wear, for example, around her wrist, around her forearm, or around her neck. Similarly, in particular embodiments, the mobile device 109 may include, for example, any mobile electronic device (e.g., a mobile phone, a tablet computer, a laptop computer, and so forth) that the user may carry in her hand, inside of her shirt pocket, or inside of her purse, for example. As it may be appreciated, in particular embodiments in which the XR device 102 includes lightweight devices, such as goggles, eyeglasses, spectacles, a visor, and so forth, the XR device 102 may, due to the smaller architectural area, include reduced power management (e.g., batteries, battery size) and thermal management (e.g., cooling fans, heat sinks) electronics. Additionally, in particular embodiments, the XR device 102, the wearable device 108, and the mobile device 109 may each be associated with unique performance characteristics, power characteristics, and thermal characteristics.

Thus, as will be further appreciated with respect to FIGS. 2, 3, 4A-4H, it may be useful to provide an N-device thermal management and workload distribution framework to dynamically select an N number of devices and schedule and distribute the processing workload across each of the devices or a subset of the devices based on runtime thermal conditions. In this way, the N-device thermal management and workload distribution framework may dynamically configure and switch the respective operations being performed by the respective devices based on the current thermal conditions, such that even under changing device operating conditions (e.g. user moving from an indoor space to an outdoor space, changes in ambient temperature, and so forth), the user XR experience may proceed seamlessly and more desirably.

Figure 2:
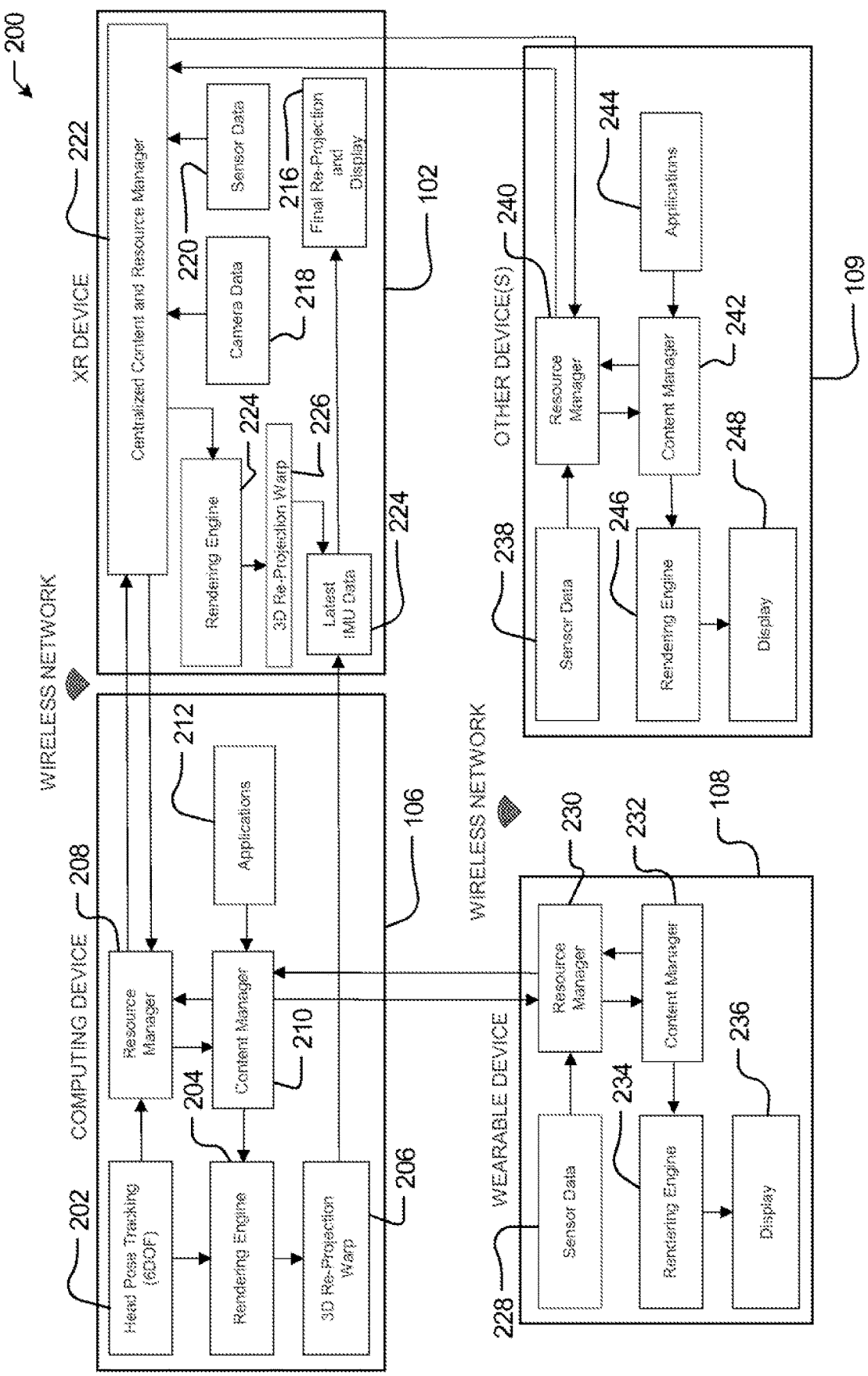
FIG. 2 illustrates a detailed embodiment of an extended reality (XR) system with an available network connection.

FIG. 2 illustrates a detailed embodiment of an extended reality (XR) ecosystem 200 for providing an N-device thermal management and workload distribution framework to dynamically select an N number of devices and schedule and distribute the processing workload across each of the devices or a subset of the devices based on runtime thermal conditions, in accordance with the presently disclosed embodiments. As depicted, the computing device 106 may include a head pose tracking functional block 202, a rendering engine 204, a 3D re-projection warping functional block 206, a resource manager 208, a content manager 210, and applications 212. In particular embodiments, the computing device 106 may generate frames corresponding to a sequence of image frames (e.g., (R)ed, (B)lue, (G)reen image data) via the rendering engine 204. In particular embodiments, the computing device 106 may also access one or more depth maps corresponding to the frames. In particular embodiments, as further depicted, the computing device 106 may also maintain and keep track of pose information (e.g., head pose data, object pose data) of one or more objects within the frames calculated by the head pose functional block 210 and pose data received from the XR device 102.

In particular embodiments, the computing device 106 may host and service applications 212, which may include, for example, XR experiences executing on the XR device 102. For example, in particular embodiments, the applications 212 may include, for example, XR applications, such as video gaming applications (e.g., single-player games, multi-player games, first-person point of view (POV) games), mapping applications, music playback applications, video-sharing platform applications, video-streaming applications, e-commerce applications, social media applications, user interface (UI) applications, or other XR applications users 102 may experience. In particular embodiments, as further depicted by FIG. 2, the applications 212 or other XR content may be analyzed and managed by way of the content manager 208. For example, in particular embodiments, the content manager may include, for example, any system (e.g., software system) that may be utilized to analyze and manage 3D content associated with the applications 212 to be rendered and displayed by the XR device 102. Similarly, the resource manager 210 may include, for example, any system (e.g., software system) that keeps track of the available hardware and/or software components for hosting and servicing the applications 212 or other XR content.

In particular embodiments, as further depicted by FIG. 2, the computing device 106 may render frames (e.g., RGB-D frames) corresponding to the applications 212 or other XR content utilizing the rendering engine 204. In particular embodiments, the rendering engine 204 may then output the rendered frames to the 3D re-projection warping functional block 206, which may be utilized to compensate for network latency for the viewpoint change in that the rendered frames are provided over the network 104 to the XR device 102. In particular embodiments, as further depicted, the rendered and warped frames may be then passed from the 3D re-projection warping functional block 206 over the network 104 to a latest IMU functional block 214 of the XR device 102. In particular embodiments, the latest IMU functional block 214 may be utilized to associate the rendered and warped frames with the latest user head pose data and object pose data (e.g., real-time or near real-time head pose data and/or object pose data), for example, and re-project and display the frames 216 on the one or more displays of the XR device 102 to be interacted with by a user of the XR device 102.

In particular embodiments, as previously discussed above with respect to FIG. 1, in instances in which the XR device 102 includes, for example, lightweight XR glasses and/or other wearable electronic devices as opposed to more robust headset devices, the XR device 102 may, in comparison, include reduced processing power, low-resolution cameras, and/or relatively simple tracking optics. Additionally, due to the smaller architectural area, the XR device 102 may also include reduced power management (e.g., batteries, battery size) and thermal management (e.g., cooling fans, heat sinks) electronics. Thus, without the presently disclosed embodiments of providing an N-device thermal management and workload distribution framework to dynamically select an N number of devices and schedule and distribute the processing workload across each of the devices or a subset of the devices based on runtime thermal conditions, the computing device 106, the XR device 102, the wearable device 108, and/or other devices 109 would otherwise be precluded from maximizing performance while reducing power consumption and thermal impact.

For example, as further depicted by FIG. 2, in particular embodiments, the XR device 102 may include a centralized content and resource manager 222 (e.g., content and scene manager) that may be utilized to perform various rendering workload management techniques for reducing the processing capacity, power consumption, and thermal impact as the XR device 102 renders and displays frames to a user. In some embodiments, the present rendering workload management techniques may be performed by the centralized content and resource manager 222 of the XR device 102 and post-rendering with respect to the computing device 106 (e.g., after frames are generated and rendered by the rendering engine 204 of the computing device 106 and provided to the XR device 102). In other embodiments, the present rendering workload management techniques may be performed by the centralized content and resource manager 222 while a rendering and displaying of one or more frames (e.g., RGB-D frames) is already in-progress (e.g., in real-time or near real-time). Still, in other embodiments, the present rendering workload management techniques may be orchestrated solely by the centralized content and resource manager 222 of the XR device 102 and performed by the rendering engine 224 of the XR device 102.

For example, in particular embodiments, the content manager 208 and/or resource manager 210 of the computing device 106 may provide, to the centralized content and resource manager 222, a request for frames (e.g., RGB-D frames) associated with one or more applications 212 to be rendered and displayed by the XR device 102, and the centralized content and resource manager 222 may then determine the manner in which to render and display the requested frames (e.g., RGB-D frames). The centralized content and resource manager 222 may then carry out the rendering and displaying of the requested frames (e.g., RGB-D frames) by instructing and utilizing the rendering engine 224 and 3D re-projection warp functional block 226. In one example embodiment, the centralized content and resource manager 222 may include, for example, any system (e.g., software system) that may be utilized to analyze, process, and manage frames of XR content to be rendered and displayed by the XR device 102.

In particular embodiments, the centralized content and resource manager 222 may include, for example, an N-device thermal management and workload distribution framework (e.g., a software framework, a hardware framework, or a combinational framework of software and hardware) that maintains and keeps track of the available hardware resources and/or software resources (e.g., camera data 218, sensor data 220, processing capacity, memory capacity, power consumption, processing time, network 104 bandwidth, network 104 latency, network 104 data throughput, network 104 quality, and so forth) to be utilized for rendering and displaying frames of XR content on the XR device 102.

In particular embodiments, as further depicted by FIG. 2, the XR ecosystem 200 may also include the wearable device 108 and/or other device(s) 109. As depicted, the XR device 102, the wearable device 108, and the mobile device 109 may each be associated with unique performance characteristics, power characteristics, and thermal characteristics. For example, as depicted, the wearable device 108 may include associated sensor data 228, resource manager 230, content manager 232, rendering engine 234, and display 236.

Similarly, as depicted, the other device(s) 109 may include associated sensor data 238, resource manager 240, content manager 242, one or more other applications 244, rendering engine 246, and display 248. In particular embodiments, the wearable device 108 may provide sensor data 228 (e.g., operating temperature data, touch pressure data, ambient temperature data, lighting data, motion data, biometric data, health data, and so forth) and the other device 109 may provide sensor data 238 (e.g., operating temperature data, touch pressure data, ambient temperature data, lighting data, motion data, biometric data, health data, and so forth) to the centralized content and resource manager 222 as an indication of the runtime performance characteristics, power characteristics, and thermal characteristics.

In particular embodiments, in accordance with the presently disclosed techniques, the centralized content and resource manager 222 (e.g., N-device thermal management and workload distribution framework) may receive a request to render, onto the ecosystem 200 of devices 102, 106, 108, and 109, a frame of virtual content. As depicted, in one embodiment, the centralized content and resource manager 222 (e.g., N-device thermal management and workload distribution framework) may be hosted by the XR device 102. In another embodiment, the centralized content and resource manager 222 (e.g., N-device thermal management and workload distribution framework) may be hosted by any one of the ecosystem 200 of devices 102, 106, 108, and 109. In particular embodiments, the centralized content and resource manager 222 (e.g., N-device thermal management and workload distribution framework) may then determine, for each of the ecosystem 200 of devices 102, 106, 108, and 109, a thermal constraint differential (e.g., thermal design power (TDP) limit headroom) based on head pose tracking and sensor data 202, 228, 238 associated with the ecosystem 200 of devices 102, 106, 108, and 109.

For example, in particular embodiments, the centralized content and resource manager 222 (e.g., N-device thermal management and workload distribution framework) may determine, for each of the ecosystem 200 of devices 102, 106, 108, and 109, the thermal constraint differential by determining a difference between the TDP limit and a current power consumption (e.g., TDP limit headroom for each of the ecosystem 200 of devices 102, 106, 108, and 109). In particular embodiments, the thermal constraint differential (e.g., TDP limit headroom for each of the ecosystem 200 of devices 102, 106, 108, and 109) may be determined at runtime of, for example, the applications 212 to be rendered by the computing device 106 and XR device 102.

In particular embodiments, the centralized content and resource manager 222 (e.g., N-device thermal management and workload distribution framework) may then determine, based on the thermal constraint differential, one or more rendering workload assignments to be performed by the ecosystem 200 of devices 102, 106, 108, and 109, in which the one or more rendering workload assignments may correspond to one or more partitions of a rendering workload associated with rendering the frame. For example, in particular embodiments, prior to determining, based on the thermal constraint differential, the one or more rendering workload assignments, the centralized content and resource manager 222 (e.g., N-device thermal management and workload distribution framework) may determine one or more execution parameters (e.g., AR features utilized for the application 202, a quality of service (QoS) performance demand, and so forth) associated with the application 202 corresponding to the frame of virtual content.

In particular embodiments, the centralized content and resource manager 222 (e.g., N-device thermal management and workload distribution framework) may then estimate, based on the one or more execution parameters (e.g., AR features utilized for the application 202, a quality of service (QoS) performance demand, and so forth) associated with the application 202, a power consumption of the rendering workload associated with rendering the frame. In particular embodiments, the centralized content and resource manager 222 (e.g., N-device thermal management and workload distribution framework) may then determine the one or more rendering workload assignments to be performed by the ecosystem 200 of devices 102, 106, 108, and 109 based on the thermal constraint differential (e.g., TDP limit headroom for each of the ecosystem 200 of devices 102, 106, 108, and 109) and the estimation of the power consumption of the rendering workload associated with rendering the frame.

In particular embodiments, the centralized content and resource manager 222 (e.g., N-device thermal management and workload distribution framework) may then distribute the one or more rendering workload assignments to a selected subset (e.g., XR device 102, computing device 106, and wearable device 108) of the ecosystem 200 of devices 102, 106, 108, and 109 to reduce the rendering workload associated with rendering the frame and to satisfy one or more power or thermal constraints associated with the ecosystem 200 of devices 102, 106, 108, and 109. For example, in particular embodiments, the selected subset (e.g., XR device 102, computing device 106, and wearable device 108) of the ecosystem 200 of devices 102, 106, 108, and 109 is determined based on the thermal constraint differential (e.g., TDP limit headroom for each of the ecosystem 200 of devices 102, 106, 108, and 109) and a device characteristic (e.g., device processing speed, device storage capacity, device thermal rating, device power rating, and so forth). For example, in particular embodiments, a number of the one or more rendering workload assignments may be greater than (e.g., N'>N) a number of the selected subset (e.g., XR device 102, computing device 106, and wearable device 108) of the ecosystem 200 of devices 102, 106, 108, and 109. In particular embodiments, the centralized content and resource manager 222 (e.g., N-device thermal management and workload distribution framework) may then render the frame utilizing the selected subset (e.g., XR device 102, computing device 106, and wearable device 108) of the ecosystem 200 of devices 102, 106, 108, and 109.

Thus, in accordance with the foregoing embodiments, the present techniques are directed toward providing an N-device thermal management and workload distribution framework to dynamically select an N number (e.g., N=1, 2, 3, . . . , N) of devices 102, 106, 108 and schedule and distribute the processing workload across an ecosystem 200 of devices 102, 106, 108, and 109 or a subset of the ecosystem 200 of devices 102, 106, 108, and 109 based on runtime thermal conditions. For example, the N-device thermal management and workload distribution framework may utilize sensor data or other telemetry data to determine processing performance, power consumption, operating temperature, ambient temperature, and so forth with respect to each of the ecosystem 200 of devices 102, 106, 108, and 109. The N-device thermal management and workload distribution framework may then calculate the TDP limit headroom for each of the ecosystem of devices 102, 106, 108, and 109. The TDP may be utilized for determining which devices 102, 106, 108, and 109 of the ecosystem of devices 102, 106, 108, and 109 to utilize and the manner in which the current processing workload should be distributed across the ecosystem 200 of devices 102, 106, 108, and 109, such that performance is maximized while reducing power consumption and thermal impact. For example, the N-device thermal management and workload distribution framework may, at runtime, schedule and distribute the processing workload to be performed on the respective devices 102, 106, 108, and 109, and then dynamically configure and switch the respective operations being performed by the respective devices 102, 106, 108, and 109 based on the current thermal conditions, such that even under changing device operating conditions (e.g. user moving from an indoor space to an outdoor space, changes in ambient temperature, and so forth), the user XR experience may proceed seamlessly and more desirably.

Figure 3:
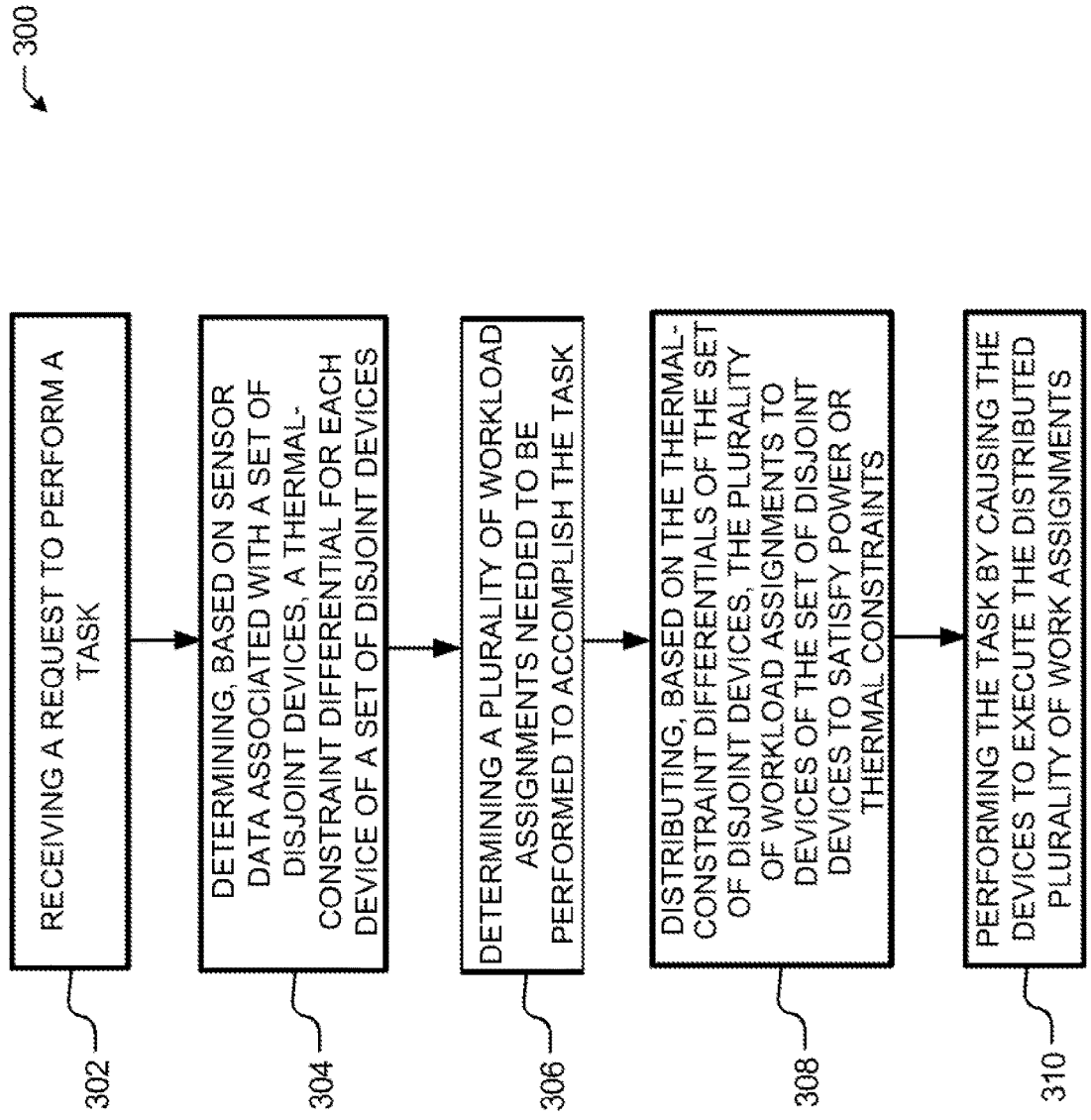
FIG. 3 illustrates is a flow diagram of a method for providing rendering workload management techniques for reducing processing capacity, power consumption, and thermal impact of a device based on generating a set of rending parameters for rendering a frame in order to reduce the rendering workload.

FIG. 3 illustrates a flow diagram of a method 300 for providing an N-device thermal management and workload distribution framework to dynamically select an N number of devices and schedule and distribute the processing workload across each of the devices or a subset of the devices based on runtime thermal conditions, in accordance with presently disclosed techniques. The method 300 may be performed utilizing one or more processing devices (e.g., centralized resource and content manager 222) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 300 may begin at block 302 with one or more processing devices (e.g., centralized resource and content manager 222) receiving a request to perform a task. The method 300 may continue at block 304 with the one or more processing devices (e.g., centralized resource and content manager 222) determining, based on sensor data associated with the set of disjoint devices, a thermal-constraint differential for each device of the set of disjoint devices. The method 300 may continue at block 306 with the one or more processing devices (e.g., centralized resource and content manager 222) determining a plurality of workload assignments needed to be performed to accomplish the task. The method 300 may continue at block 308 with the one or more processing devices (e.g., centralized resource and content manager 222) distributing, based on the thermal-constraint differentials of the set of disjoint devices, the plurality of workload assignments to one or more devices of the set of disjoint devices to satisfy one or more power or thermal constraints associated with each device of the set of disjoint devices. The method 300 may then conclude at block 310 with the one or more processing devices (e.g., centralized resource and content manager 222) performing the task by causing the one or more devices to execute the distributed plurality of work assignments.

Accordingly, as described by the method 300 of FIG. 3, the present techniques are directed toward providing an N-device thermal management and workload distribution framework to dynamically select an N number of devices and schedule and distribute the processing workload across each of the devices or a subset of the devices based on runtime thermal conditions. For example, the N-device thermal management and workload distribution framework may utilize sensor data or other telemetry data to determine processing performance, power consumption, operating temperature, ambient temperature, and so forth with respect to each of the ecosystem of devices. The N-device thermal management and workload distribution framework may then calculate the available thermal design power (TDP) limit headroom for each of the ecosystem of devices. The TDP may be utilized for determining which devices of the ecosystem of devices to utilize and the manner in which the current processing workload should be distributed across these devices, such that performance is maximized while reducing power consumption and thermal impact. For example, the N-device thermal management and workload distribution framework may, at runtime, schedule and distribute the processing workload to be performed on the respective devices of the ecosystem of devices, and then dynamically configure and switch the respective operations being performed by the respective devices based on the current thermal conditions, such that even under changing device operating conditions (e.g. user moving from an indoor space to an outdoor space, changes in ambient temperature, and so forth), the user XR experience may proceed seamlessly and more desirably.

FIG. 4A and FIG. 4B illustrate respective example embodiments 400A and 400B for providing an N-device thermal management and workload distribution framework to dynamically select an N number of devices and schedule and distribute the processing workload across each of the devices or a subset of the devices based on runtime thermal conditions, in accordance with the presently disclosed embodiments. The example embodiment 400A includes a device 402A (e.g., "Device 1") and a device 404A (e.g., "Device 2") and illustrates the manner in which workload components 406A (e.g., "WL-C1"), 408A (e.g., "WL-C2"), 410A (e.g., "WL-C3"), and 412A (e.g., "WL-C4") may be distributed across the device 402A (e.g., "Device 1") and the device 404A (e.g., "Device 2"). Similarly, the example embodiment 400B includes a device 402B (e.g., "Device 1") and a device 404B (e.g., "Device 2") and illustrates the manner in which workload components 406B (e.g., "WL-C1"), 408B (e.g., "WL-C2"), 410B (e.g., "WL-C3"), and 412B (e.g., "WL-C4") may be distributed across the device 402B (e.g., "Device 1") and the device 404B (e.g., "Device 2").

As depicted by example embodiment 400A, the workload components may be distributed in an inter-device or intra-device manner such that, for example, workload component 406A (e.g., "WL-C1") may be processed by the device 402A (e.g., "Device 1"), while workload components 408A (e.g., "WL-C2"), 410A (e.g., "WL-C3"), and 412A (e.g., "WL-C4") may be processed by the device 404A (e.g., "Device 2"). It should be appreciated that although the workload components 406A (e.g., "WL-C1"), 408A (e.g., "WL-C2"), 410A (e.g., "WL-C3"), and 412A (e.g., "WL-C4") may be distributed across multiple devices 402A (e.g., "Device 1") and 404A (e.g., "Device 2"), the workload components 406A (e.g., "WL-C1"), 408A (e.g., "WL-C2"), 410A (e.g., "WL-C3"), and 412A (e.g., "WL-C4") may be processed and implemented in a serial manner and in accordance with, for example, the requirements of the application 202 to which the workload components 406A (e.g., "WL-C1"), 408A (e.g., "WL-C2"), 410A (e.g., "WL-C3"), and 412A (e.g., "WL-C4").

Similarly, as depicted by example embodiment 400B, the workload components may be distributed in an inter-device or intra-device manner such that, for example, workload components 406B (e.g., "WL-C1") and 408B (e.g., "WL-C2") may be processed by the device 402B (e.g., "Device 1"), while workload components 410B (e.g., "WL-C3") and 412B (e.g., "WL-C4") may be processed by the device 404B (e.g., "Device 2"). As previously noted above, it should be appreciated that although the workload components 406B (e.g., "WL-C1"), 408B (e.g., "WL-C2"), 410B (e.g., "WL-C3"), and 412B (e.g., "WL-C4") may be distributed across multiple devices 402B (e.g., "Device 1") and 404B (e.g., "Device 2"), the workload components 406B (e.g., "WL-C1"), 408B (e.g., "WL-C2"), 410B (e.g., "WL-C3"), and 412B (e.g., "WL-C4") may be processed and implemented in a serial manner and in accordance with, for example, the requirements of the application 202 to which the workload components 406B (e.g., "WL-C1"), 408B (e.g., "WL-C2"), 410B (e.g., "WL-C3"), and 412B (e.g., "WL-C4").

Figure 4D:
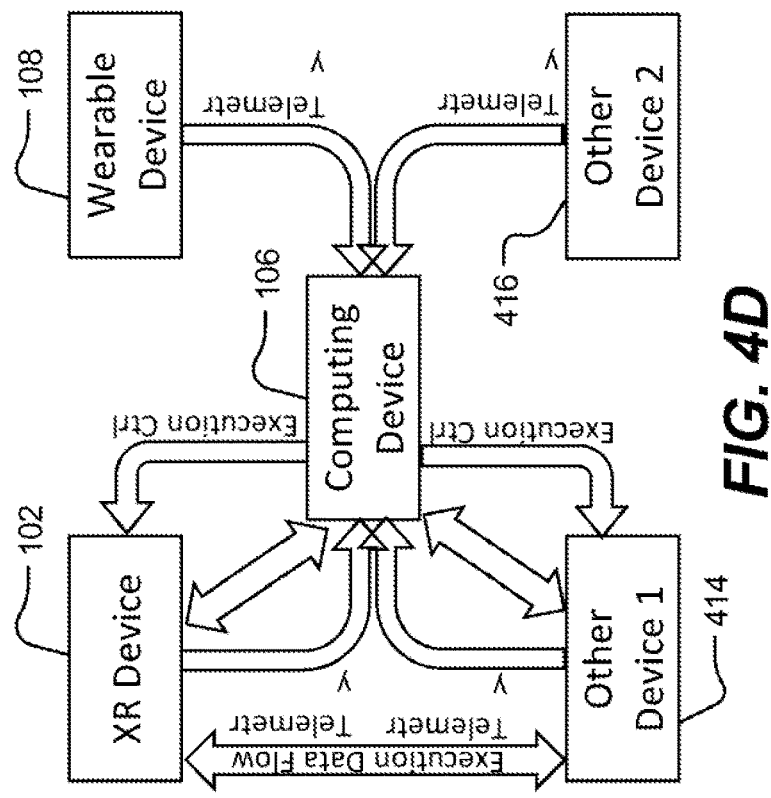
Figure 4C:
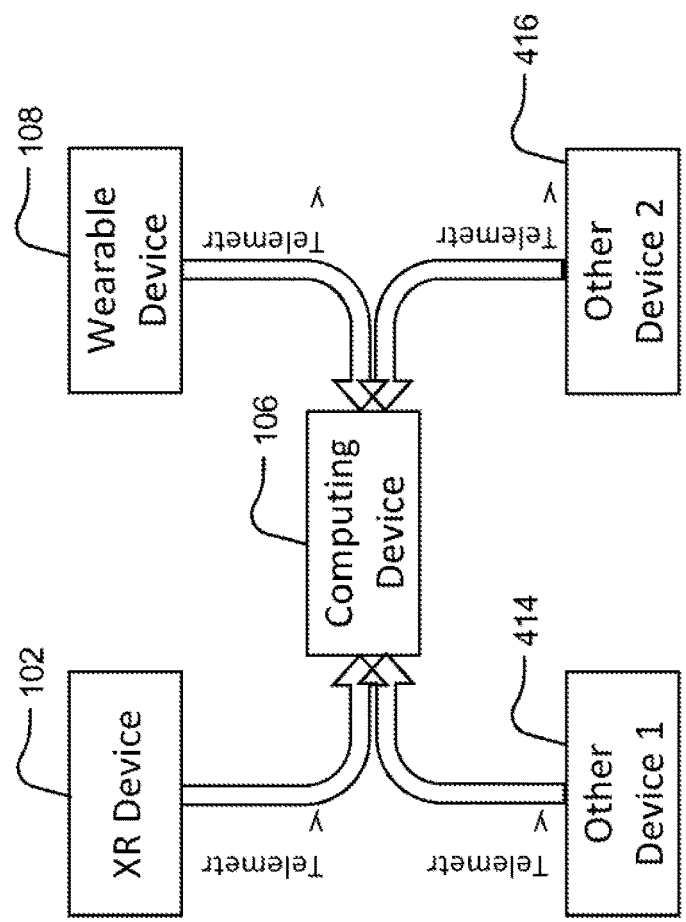

FIG. 4C and FIG. 4D illustrate an example multibody ecosystem including N=5 disjoint devices (e.g., computing device 106, XR device 102, wearable device 108, other device 414, and other device 416). In particular embodiments, the centralized content and resource manager 222 (e.g., N-device thermal management and workload distribution framework) may be executed, for example, on the computing device 106, but, in other embodiments, may be migrated and/or implemented on the XR device 102. In particular embodiments, the centralized content and resource manager 222 (e.g., N-device thermal management and workload distribution framework) may form a system for workload execution by selecting N devices from N' available devices 102, 106, 108, 414, and 416 (e.g., N'≥N) to support an application 202 use-case and then assign workload components to these N devices for execution.

In particular embodiments, the centralized content and resource manager 222 (e.g., N-device thermal management and workload distribution framework) may then continuously monitor power and thermal telemetry data received from the N' available devices 102, 106, 108, 414, and 416 and dynamically adjust the distribution of the workload components at runtime. For example, FIG. 4C illustrates that the centralized content and resource manager 222 (e.g., N-device thermal management and workload distribution framework) performs collection of sensor data and telemetry data from the N' available devices 102, 106, 108, 414, and 416. Continue the example, FIG. 4D illustrates the selection of the N devices 102, 106, and 414 from the N' available devices 102, 106, 108, 414, and 416 for workload execution. Specifically, as depicted by FIG. 4D, the XR device 102, computing device 106, and other device 414 (e.g., N=3) are selected for workload dataflow execution.

Figure 4F:
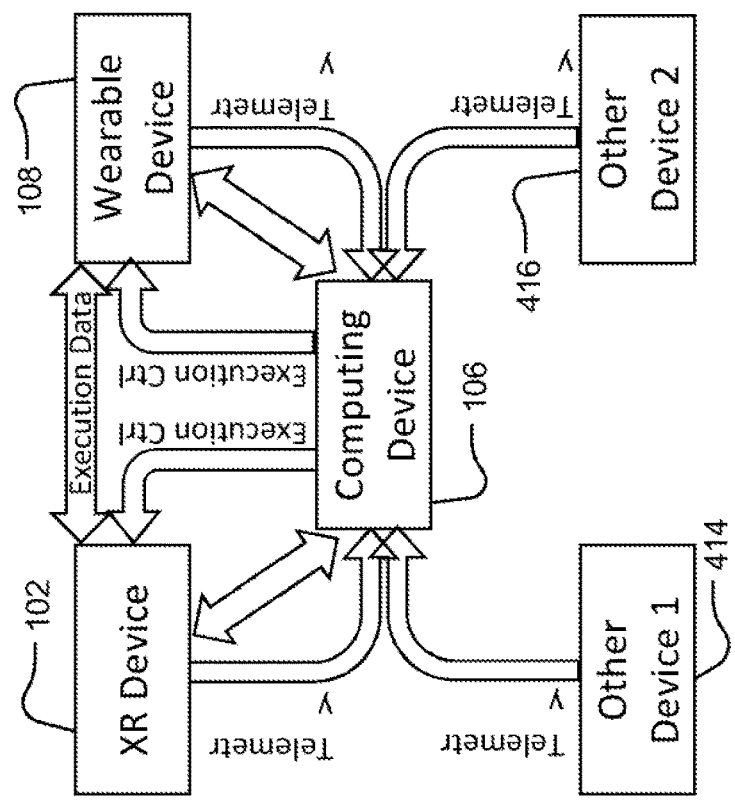
Figure 4E:
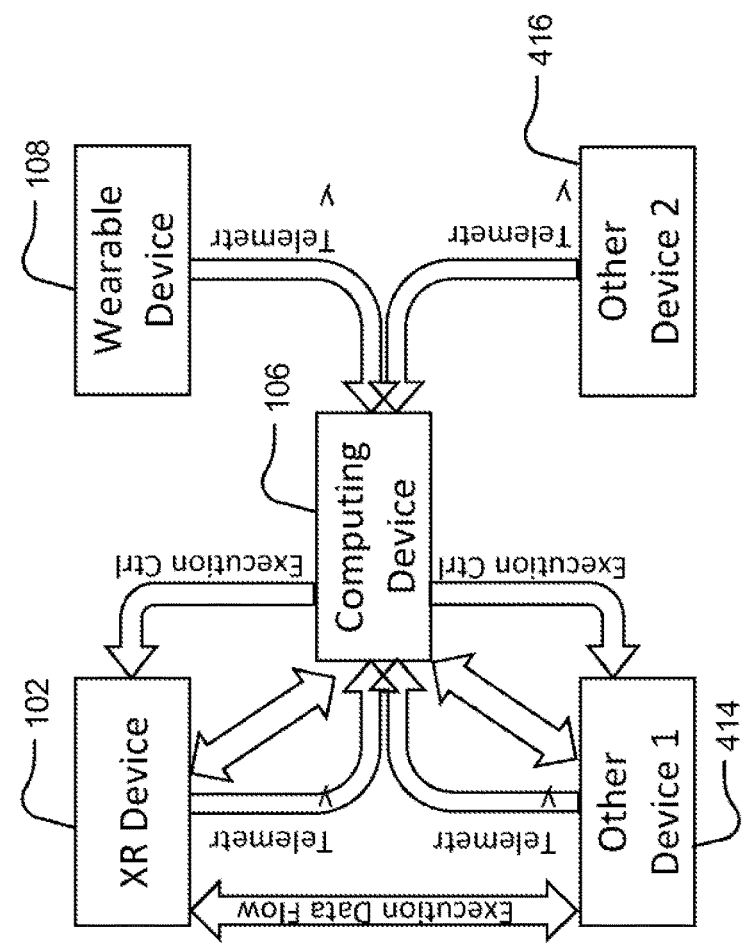

FIG. 4E and FIG. 4F illustrate a similar example as discussed above with respect to FIGS. 4C and 4D. For example, as depicted by FIGS. 4E and 4F, as the workload continues execution, the centralized content and resource manager 222 (e.g., N-device thermal management and workload distribution framework) running on the computing device 106 continues to monitoring sensor data telemetry data from the N' available devices 102, 106, 108, 414, and 416 and reevaluates the initial device selection and initial workload to device assignment. For example, FIG. 4F illustrates an example of when the centralized content and resource manager 222 (e.g., N-device thermal management and workload distribution framework) decides to change both device selection and workload to device assignment. As depicted by FIG. 4F, the wearable device 108 is selected instead of the other device 414 for the N device ecosystem, which after the dynamic switch of devices, includes the computing device 106, the XR device 102, and the wearable device 108.

Figures 4G, 4H:
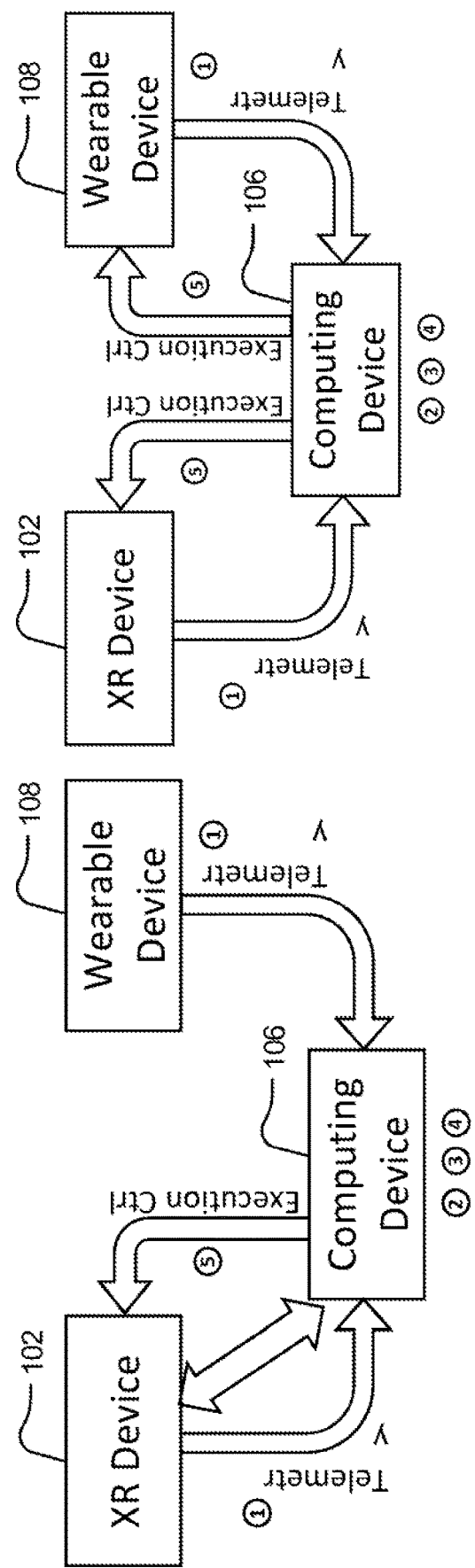

FIG. 4G illustrates an example in which N-device ecosystem includes the XR device 102, the computing device 106, and the wearable device 108. In particular embodiments, the centralized content and resource manager 222 (e.g., N-device thermal management and workload distribution framework) has the objective of reducing the amount of thermal throttling (e.g., sustain high performance user experience for longer) while prolonging the application 202 use-case runtime and mitigating thermal impact. For example, in one embodiment, the application 202 use-case may include a video recording using the point of view (POV) camera on the XR device 102 and the N device system is, for example, subject to outdoor ambient conditions (e.g., on a summer day, the computing device 106 may be in a shaded or cooled area while the XR device 102 may be directly in the sun).

In particular embodiments, the centralized content and resource manager 222 (e.g., N-device thermal management and workload distribution framework) may proceed by collecting power telemetry and thermal telemetry from each of the XR device 102, the computing device 106, and the wearable device 108. The centralized content and resource manager 222 (e.g., N-device thermal management and workload distribution framework) may then estimate, for each device, available TDP limit headroom (e.g., the amount of power budget available for each of the XR device 102, the computing device 106, and the wearable device 108). The centralized content and resource manager 222 (e.g., N-device thermal management and workload distribution framework) may then estimate, for each device, a use-case power demand (e.g., determined based on the hardware components, software components, or combinational hardware and software component and component availability of each of the XR device 102, the computing device 106, and the wearable device 108).

In particular embodiments, the centralized content and resource manager 222 (e.g., N-device thermal management and workload distribution framework) may then estimate whether use-case may be thermally sustained. For example, in one embodiment, the computing device 106 may be reaching thermal limit, and if the application 202 use-case execution continues in the current configuration, thermal impact may cause a system shut down in a few seconds (e.g., less than 1 minute or less than 30 minutes). The centralized content and resource manager 222 (e.g., N-device thermal management and workload distribution framework) may then estimate that maintaining video content temporarily stored on the XR device 102 and reducing workload processing on the computing device 106 may enable supporting use-case for longer. The centralized content and resource manager 222 (e.g., N-device thermal management and workload distribution framework) may then dynamically switch the execution flow and communicate to XR device 102 to temporarily store video content to maintain high performance user experience while reducing thermal impact with respect to, for example, the computing device 106. In one embodiment, the video data may be transferred back to the computing device 106 once, for example, the computing device 106 is allowed to cool down well below the TDP limit (e.g., an increase to the TDP limit headroom of the XR device 102).

FIG. 4H illustrates an example, which illustrates user experience degradation or reduce risk of thermal shutdown in short intervals where the N-device ecosystem temperature is undesirably high. In particular embodiments, one or more of the computing device 106, the XR device 102, and the wearable device 108 may fall below the target performance threshold. In particular embodiments, the centralized content and resource manager 222 (e.g., N-device thermal management and workload distribution framework) may shift workload power consumption between, for example, the computing device 106, the XR device 102, and the wearable device 108 to leverage TDP headroom in one or more of the computing device 106, the XR device 102, and the wearable device 108 and allow for cooling of one or more of the other of the computing device 106, the XR device 102, and the wearable device 108.

In particular embodiments, to allow cooling between devices of the N-device ecosystem, the centralized content and resource manager 222 (e.g., N-device thermal management and workload distribution framework) may, for example, select local storage and postponed data transfers whenever possible to reduce power consumption of the device of the N-device ecosystem (e.g., the computing device 106, the XR device 102, and the wearable device 108) that may be causing user experience and performance to suffer.

In other embodiments, one or more performance, power, thermal, and storage simulations may be performed by the centralized content and resource manager 222 (e.g., N-device thermal management and workload distribution framework) to quantify the percentages of cases in which the centralized content and resource manager 222 (e.g., N-device thermal management and workload distribution framework) may increase performance of one or more of the N-device ecosystem (e.g., the computing device 106, the XR device 102, and the wearable device 108) by reducing the amount of thermal throttling or the occurrence of thermal shutdown. In this way, the simulations may allow for the user experience to be quantified and dynamically improved by performing workload dataflow reorganization (e.g., as opposed to performance throttling and quantifying how much longer an application 202 use-case can run in thermally constrained conditions by leveraging TDP imbalance in the N-device ecosystem).

Figure 5:
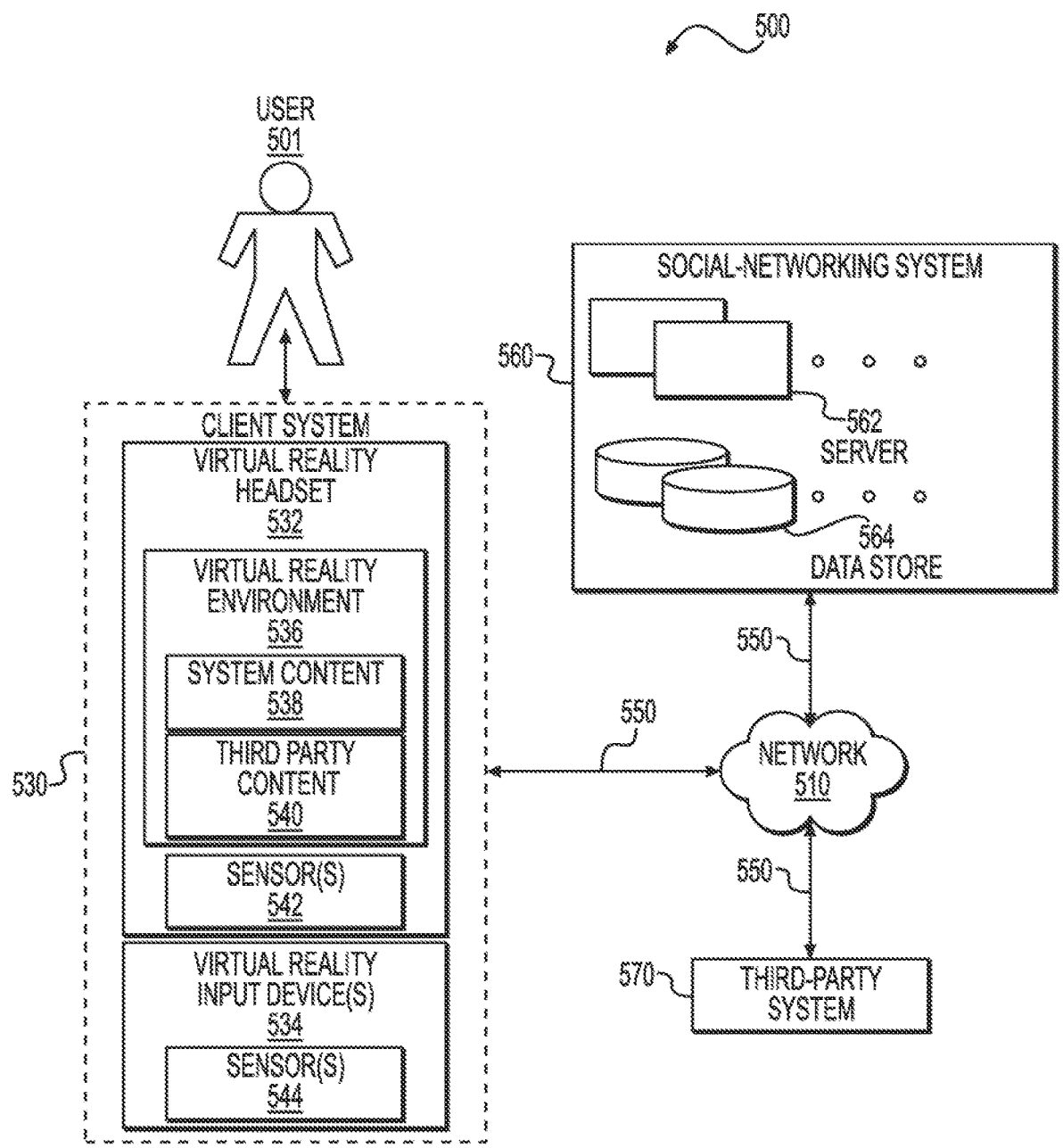
FIG. 5 illustrates an example network environment associated with a social-networking system.

FIG. 5 illustrates an example network environment 500 associated with an extended reality (XR) system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example, and not by way of limitation, two or more of users 501, a client system 530, a social-networking system 560, and a third-party system 570 may be connected to each other directly, bypassing a network 510. As another example, two or more of client systems 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example, and not by way of limitation, network environment 500 may include multiple users 501, client systems 530, social-networking systems 560, third-party systems 570, and networks 510.

This disclosure contemplates any suitable network 510. As an example, and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510. Links 550 may connect a client system 530, a social-networking system 560, and a third-party system 570 to a communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In particular embodiments, a client system 530 may be an electronic device including hardware, software, or embedded logic components or a combination of two or more such components and capable of carrying out the appropriate functionalities implemented or supported by a client system 530. As an example, and not by way of limitation, a client system 530 may include a computer system such as a desktop computer, notebook or laptop computer, netbook, a tablet computer, e-book reader, GPS device, camera, a digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In particular embodiments, a client system 530 may include a virtual reality (or augmented reality) headset 532, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset.

Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively, or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOLBXR or YAHOO TOOLBXR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example, and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 560 may be a network-addressable computing system that may host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example, and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In particular embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof.

In particular embodiments, each server 562 may include hardware, software, or embedded logic components or a combination of two or more such components for carrying out the appropriate functionalities implemented or supported by server 562. In particular embodiments, the social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, the social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In particular embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In particular embodiments, the social-networking system 560 may provide users with the ability to take actions on various types of items or objects, supported by the social-networking system 560. As an example, and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In particular embodiments, the social-networking system 560 may be capable of linking a variety of entities. As an example, and not by way of limitation, the social-networking system 560 may enable users to interact with each other as well as receive content from third-party systems 570 or other entities, or to allow users to interact with these entities through an application programming interfaces (API) or other communication channels. In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In particular embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 560 also includes user-generated content objects, which may enhance a user's interactions with the social-networking system 560. User-generated content may include anything a user may add, upload, send, or "post" to the social-networking system 560. As an example, and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream. In particular embodiments, the social-networking system 560 may include a variety of servers, sub-systems, programs, modules, logs, and data stores. In particular embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof.

In particular embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560.

In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user may determine how particular information associated with a user may be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
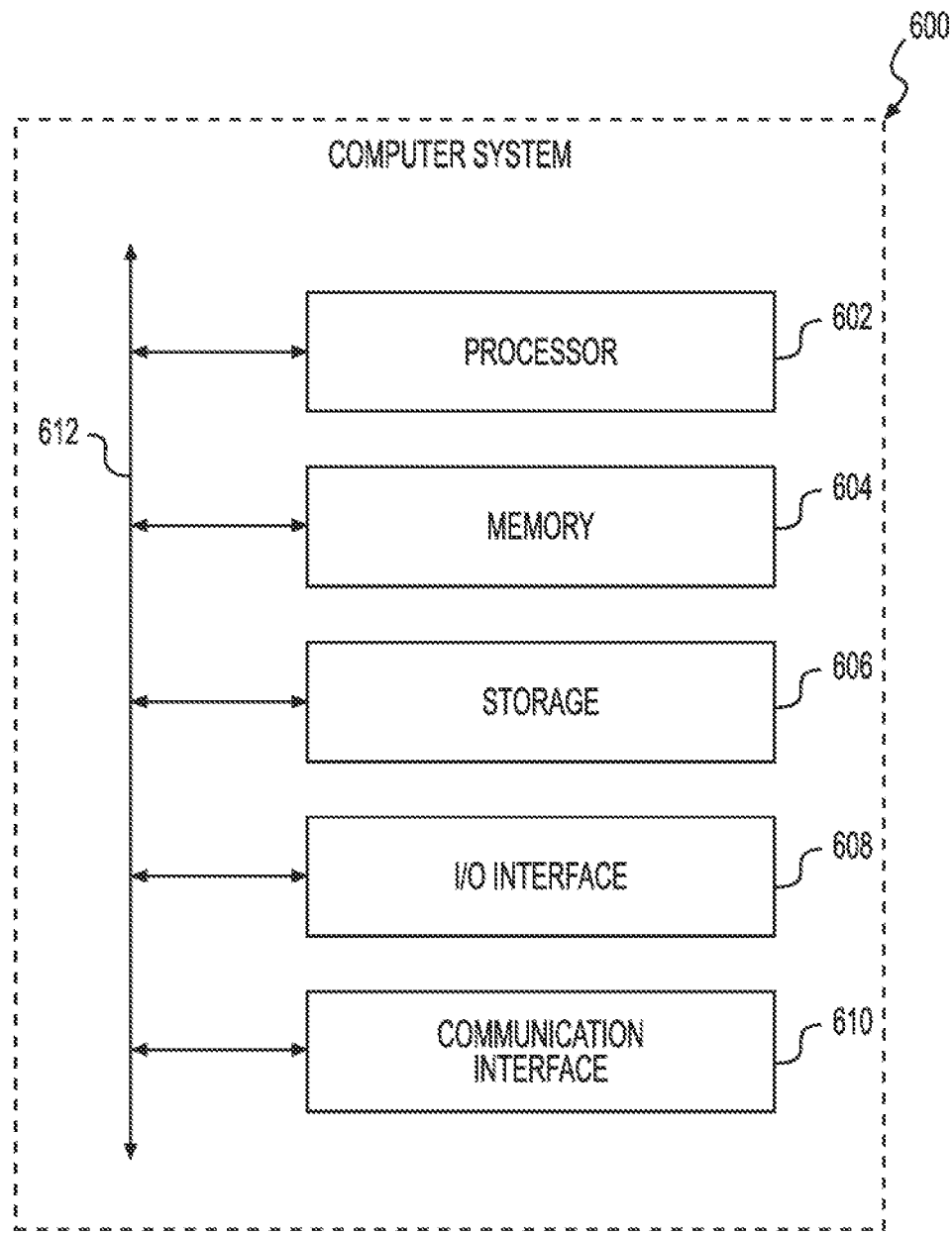
FIG. 6 illustrates an example computer system.

FIG. 6 illustrates an example computer system 600 that may be useful in performing one or more of the foregoing techniques as presently disclosed herein. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein.

As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EXROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a user and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a user having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a user having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by a computing system associated with a set of disjoint devices in an extended reality (XR) ecosystem that includes at least one XR device, comprising:
   receiving a request to perform a task associated with providing XR content to a user;
   determining, based on sensor data associated with the set of disjoint devices, a thermal-constraint differential for each device of the set of disjoint devices;
   determining a plurality of workload assignments needed to be performed to accomplish the task, wherein the plurality of workload assignments is configured to be performed by one or more devices of the set of disjoint devices to satisfy one or more power or thermal constraints associated with each device of the set of disjoint devices; and
   performing the task by causing the one or more devices in the extended reality (XR) ecosystem to execute the plurality of workload assignments.

2. The method of claim 1, wherein determining, based on sensor data associated with the set of disjoint devices, the thermal-constraint differential for each device of the set of disjoint devices comprises determining a difference between a predetermined thermal design power (TDP) limit and a current power consumption.

3. The method of claim 1, wherein determining, based on sensor data associated with the set of disjoint devices, the thermal-constraint differential for each device of the set of disjoint devices comprises determining the thermal constraint differential at runtime.

4. The method of claim 1, further comprising:
   determining one or more execution parameters associated with an application corresponding to the task to be performed; and
   estimating, based on the one or more execution parameters associated with the application, a power consumption of the plurality of workload assignments.

5. The method of claim 1, wherein the one or more devices of the set of disjoint devices comprises a first subset of the set of disjoint devices, the method further comprising:
   determining, based on sensor data associated with the set of disjoint devices, a second thermal-constraint differential for each device of the set of disjoint devices; and
   redistributing, based on the second thermal-constraint differential of the set of disjoint devices, the plurality of workload assignments to a second subset of the set of disjoint devices.

6. The method of claim 5, wherein one or more devices of the second subset of the set of disjoint devices is different from one or more devices of the first subset of the set of disjoint devices.

7. The method of claim 1, wherein a number of the plurality of workload assignments is greater than a number of the one or more devices of the set of disjoint devices.

8. A computing system associated with a set of disjoint devices in an extended reality (XR) ecosystem that includes at least one XR device, one or more devices of the set of disjoint devices including:
   one or more non-transitory non-volatile computer-readable storage media including instructions; and
   one or more processors coupled to the one or more non-transitory computer-readable storage media, the one or more processors configured to execute the instructions to:
   receive a request to perform a task associated with providing XR content to a user;
   determine, based on sensor data associated with the set of disjoint devices, a thermal-constraint differential for each device of the set of disjoint devices;
   determine a plurality of workload assignments needed to be performed to accomplish the task, wherein the plurality of workload assignments is configured to be performed by one or more devices of the set of disjoint devices to satisfy one or more power or thermal constraints associated with each device of the set of disjoint devices; and perform the task by causing the one or more devices in the extended reality (XR) ecosystem to execute the plurality of workload assignments.

9. The computing system of claim 8, wherein the instructions to determine, based on sensor data associated with the set of disjoint devices, the thermal-constraint differential for each device of the set of disjoint devices further comprise instructions to determine a difference between a predetermined thermal design power (TDP) limit and a current power consumption.

10. The computing system of claim 8, wherein the instructions to determine, based on sensor data associated with the set of disjoint devices, the thermal-constraint differential for each device of the set of disjoint devices further comprises instructions to determine the thermal constraint differential at runtime.

11. The computing system of claim 8, wherein the instructions further comprise instructions to:
 determine one or more execution parameters associated with an application corresponding to the task to be performed; and
 estimate, based on the one or more execution parameters associated with the application, a power consumption of the plurality of workload assignments.

12. The computing system of claim 8, wherein the one or more devices of the set of disjoint devices comprises a first subset of the set of disjoint devices, the instructions further comprising instructions to:
 determine, based on sensor data associated with the set of disjoint devices, a second thermal-constraint differential for each device of the set of disjoint devices; and
 redistribute, based on the second thermal-constraint differential of the set of disjoint devices, the plurality of workload assignments to a second subset of the set of disjoint devices.

13. The computing system of claim 12, wherein one or more devices of the second subset of the set of disjoint devices is different from one or more devices of the first subset of the set of disjoint devices.

14. The computing system of claim 8, wherein a number of the plurality of workload assignments is greater than a number of the one or more devices of the set of disjoint devices.

15. A non-transitory non-volatile computer-readable medium comprising instructions that, when executed by one or more processors of one or more devices of a set of disjoint devices in an extended reality (XR) ecosystem that includes at least one XR device, cause the one or more processors to:
 receive a request to perform a task associated with providing XR content to a user;
 determine, based on sensor data associated with the set of disjoint devices, a thermal-constraint differential for each device of the set of disjoint devices;
 determine a plurality of workload assignments needed to be performed to accomplish the task, wherein the plurality of workload assignments is configured to be performed by one or more devices of the set of disjoint devices to satisfy one or more power or thermal constraints associated with each device of the set of disjoint devices; and
 perform the task by causing the one or more devices in the extended reality (XR) ecosystem to execute the plurality of workload assignments.

16. The non-transitory non-volatile computer-readable medium of claim 15, wherein the instructions to determine, based on sensor data associated with the set of disjoint devices, the thermal-constraint differential for each device of the set of disjoint devices further comprise instructions to determine a difference between a predetermined thermal design power (TDP) limit and a current power consumption.

17. The non-transitory non-volatile computer-readable medium of claim 15, wherein the instructions to determine, based on sensor data associated with the set of disjoint devices, the thermal-constraint differential for each device of the set of disjoint devices further comprises instructions to determine the thermal constraint differential at runtime.

18. The non-transitory non-volatile computer-readable medium of claim 15, wherein the one or more devices of the set of disjoint devices comprises a first subset of the set of disjoint devices, the instructions further comprising instructions to:
 determine, based on sensor data associated with the set of disjoint devices, a second thermal-constraint differential for each device of the set of disjoint devices; and
 redistribute, based on the second thermal-constraint differential of the set of disjoint devices, the plurality of workload assignments to a second subset of the set of disjoint devices.

19. The non-transitory non-volatile computer-readable medium of claim 18, wherein one or more devices of the second subset of the set of disjoint devices is different from one or more devices of the first subset of the set of disjoint devices.

20. The non-transitory non-volatile computer-readable medium of claim 15, wherein a number of the plurality of workload assignments is greater than a number of the one or more devices of the set of disjoint devices.

\* \* \* \* \*